United States Patent
Allcorn et al.

(10) Patent No.: US 10,727,474 B1
(45) Date of Patent: Jul. 28, 2020

(54) CAST THERMAL BATTERY ELECTRODES AND SEPARATORS USING A SALT BINDER

(71) Applicant: National Technology & Engineering Solutions of Sandia, LLC, Albuquerque, NM (US)

(72) Inventors: Eric Allcorn, Albuquerque, NM (US); Ganesan Nagasubramanian, Albuquerque, NM (US); Christopher A. Apblett, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 119 days.

(21) Appl. No.: 15/866,935

(22) Filed: Jan. 10, 2018

Related U.S. Application Data

(60) Provisional application No. 62/445,017, filed on Jan. 11, 2017.

(51) Int. Cl.
*H01M 4/08* (2006.01)
*H01M 6/36* (2006.01)
*H01M 4/04* (2006.01)
*H01M 2/14* (2006.01)
*H01M 4/62* (2006.01)

(52) U.S. Cl.
CPC ............. *H01M 4/08* (2013.01); *H01M 2/145* (2013.01); *H01M 4/0471* (2013.01); *H01M 4/0485* (2013.01); *H01M 4/621* (2013.01); *H01M 6/36* (2013.01)

(58) Field of Classification Search
CPC .... H01M 4/08; H01M 4/0485; H01M 4/0471; H01M 6/36; H01M 4/621; H01M 2/145
See application file for complete search history.

(56) References Cited

U.S. PATENT DOCUMENTS

2002/0018929 A1* 2/2002 Dai .......................... C23C 4/04
429/137

* cited by examiner

*Primary Examiner* — Cynthia K Walls
(74) *Attorney, Agent, or Firm* — Samantha Updegraff

(57) ABSTRACT

Cast components can improve the effectiveness of current state-of-the-art in thermal battery processing technology in terms of cost, labor, materials usage, and flexibility. Cast components can include cast cathodes, anodes, and separators.

19 Claims, 6 Drawing Sheets

CAST THERMAL BATTERY ELECTRODES AND SEPARATORS USING A SALT BINDER

RELATED APPLICATIONS

This application claims priority to U.S. Provisional Application No. 62/445,017, filed on Jan. 11, 2017, and entitled CAST THERMAL BATTERY ELECTRODES AND SEPARATORS USING A SALT BINDER, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to thermal batteries and, in particular, to cast thermal battery electrodes and separators using a salt binder.

BACKGROUND OF THE INVENTION

Thermal batteries (TBs) are primary electrochemical storage devices that rely on high temperature molten salts as their electrolyte, making them electrochemically inert at ambient temperatures where the salt is in the solid state. This prevents side reactions and self-discharge during storage, which, when combined with their hermetically sealed assembly, gives TBs an extremely long shelf life. TBs are activated by heating to high temperatures at which point the electrolyte salt melts and becomes ionically conductive, allowing for discharge of the TB. The melting temperature for most TB electrolyte salts is in the range of 250-450° C. Molten salts inherently have very high conductivities and this is further enhanced by the high temperature of the battery during discharge, enabling very high-power performance for TBs.

Since the late 1970's, thermal battery technology has been centered upon the $FeS_2$//Li—Si electrochemical system assembled using pellet technology. A sectional view of a typical $FeS_2$//Li—Si thermal battery is shown in FIG. 1. The discharge process for this TB is shown in Equations 1 and 2 below. In addition to the cathode and anode pellets, a separator pellet of MgO impregnated with electrolyte salt is also necessary to separate the electrodes and prevent internal shorting while a heat pellet of $Fe/KClO_4$ is included as a heat source to bring the cell to its activation temperature. The electrolyte—most commonly LiCl:KCl eutectic salt—is mixed in as a component of the cathode and separator pellets (and occasionally the anode). This system has an open circuit potential of about 2V based on only the first cathode reaction plateau (in which $Li_3Fe_2S_4$ is formed) and the Li—Si transition from $Li_{13}Si_4$ to $Li_7Si_3$.

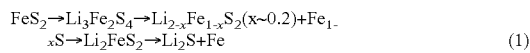

$$FeS_2 \rightarrow Li_3Fe_2S_4 \rightarrow Li_{2-x}Fe_{1-x}S_2(x\sim 0.2) + Fe_{1-x}S \rightarrow Li_2FeS_2 \rightarrow Li_2S + Fe \quad (1)$$

$$Li_{13}Si_4 \rightarrow Li_7Si_3 \rightarrow Li_{12}Si_7 \quad (2)$$

The process of making these TB pellets involves pressing powders of the battery materials at high pressure to form solid pellets. These pellets are subsequently stacked in sequence to produce a battery of the desired voltage. This process is very labor intensive and as such components produced with this method are quite expensive and slow to produce. In addition, the pellet process restricts the shape of the produced pieces to circular shapes for equal pressure distribution. This subsequently restricts thermal batteries to a cylindrical form factor.

Accordingly, there is a need for a method of casting thermal battery films that is not labor intensive, is inexpensive and fast to produce, can be manufactured in different form factors, and also delivers a TB that maintains high power capability. Embodiments of the present invention meet the needs stated above and are directed towards a method of fabricating cast TB films.

SUMMARY OF THE INVENTION

The present invention is directed to methods for fabricating a cast TB film. One method includes dissolving an amount of the salt binder adequate to obtain film adhesion into a solvent to prepare a salt binder solution, mixing an active material and electrolyte salt mixture into the salt binder solution to form a slurry, and casting the slurry onto a substrate. A high shear mixing process, such as ball milling, can be used to form a substantially homogeneous slurry prior to casting the slurry onto the substrate. The casted slurry can be dried to remove the solvent. The casting includes any broadly defined process to deposit a particulate-containing slurry onto a substrate to produce a film. Such processes include tape-casting, roll-to-roll coating, gravure printing, and 3D-printing or additive manufacturing. The substrate is an electronically conductive layer that includes a metal (e.g., stainless steel), or a conductive carbon layer (e.g., flexible graphite material, such as Grafoil®), or a porous, semi-permeable film (e.g., carbon felt, carbon paper). The use of a current collector having a porous surface as a substrate with mild permeability to the slurry can enhance surface adhesion of the electrode film by allowing permeation of the active material and binder in pores of the substrate.

To form a cast cathode, the active material can be $FeS_2$. Other active materials can also be used, as long as they are compatible with the solvent. An example of another active material includes a $CoS_2$ cathode. To form a cast anode, the active material can be Li—Si or LiAl. To form a cast separator, the active material can be MgO. The salt binder can be a simple alkali halide salt or mixture of such salts. Example electrolyte salt binders include LiCl, KCl, or a LiCl:KCl mixture. Other conductive salts, such as the ternary LiBr:LiCl:LiF salt or its constituents, can also be used as salt binders. The salt binder is dissolved in a processing solvent at a concentration adequate to provide film adhesion and cohesion. The solvent can be a high dielectric organic solvent, such as n-methyl formamide (NMF), dimethyl sulfoxide (DMSO), dimethyl methylphosphonate. After mixing with the active material and casting into a film, the solvent is removed, causing the dissolved salt to precipitate out of solution and bind the film.

An embodiment of the present invention is a method for fabricating a cast thermal battery film. The method includes adding salt binder to a solvent to form a salt binder solution. The salt binder is preferably adequate to obtain film adhesion to a substrate. Then an active material is added to the salt binder solution. The active material may optionally include an electrolyte salt. The salt binder solution and the active material are mixed to form a slurry, and then the slurry is cast onto a substrate. The solvent is then removed from the cast film to bring the salt binder out of solution to bind the film. The mixing is preferably high shear mixing, such as ball milling. The slurry is preferably substantially homogenous. The casting can include a film laydown process, such as additive manufacturing. The method can further include shaping the cast film into a form factor, such as a prismatic shape, spiral wound shape, a stacked shape or a z-fold shape. The active material can include metal sulfides and/or a lithium alloy. The separator material can be MgO. The salt binder can be an alkali halide salt. The adequate amount of salt binder is preferably greater than 20 mg/mL of solvent. The solvent can be a high dielectric organic solvent. The substrate can include a porous conductive sheet with a degree of permeability to the slurry to facilitate enhanced film adhesion. The substrate can be a current collector of a thin film of metal. The substrate can be a porous metal and may include an anode. The removing the solvent step can include drying the cast film. The thermal battery preferably performs at greater than 1 A/cm$^2$.

Another embodiment of the present invention is a non-cylindrical shaped thermal battery. This TB includes an anode, a cathode, and a separator disposed between the anode and the cathode. The TB of this embodiment if not cylindrical and can be any shape achievable with traditional coated batteries, such as, for example, prismatic, spiral wound, stacked, or z-fold.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention replaces the pellet electrode processing and configuration with a cast electrode process enabled by a salt binder of alkali halide salts or a mixture of such salts. The salt binder is preferably inorganic. Advantages of cast electrodes over pressed pellets are numerous and include but are not limited to: (1) roll-to-roll processing allows for decreased production times; (2) more rapid production and simplified methods lead to cost savings and decreased labor expenses; (3) continuous casting produces more uniform electrodes; (4) casting processes are capable of yielding thinner electrodes that can save space in the final battery design and reduce the amount of excess active material in batteries, thereby increasing practical energy and power density; and (5) there is not a restriction to cylindrical form factors so different battery shapes and designs can be enabled and produced or manufactured. Stacks of non-circular electrodes can produce new form factors or shapes for the overall TB and wound electrodes can produce new form factors for the electrodes within the TB, including but not limited to any shapes achievable with traditional coated batteries—i.e. prismatic, spiral wound, stacked, and z-fold.

Figure 1:
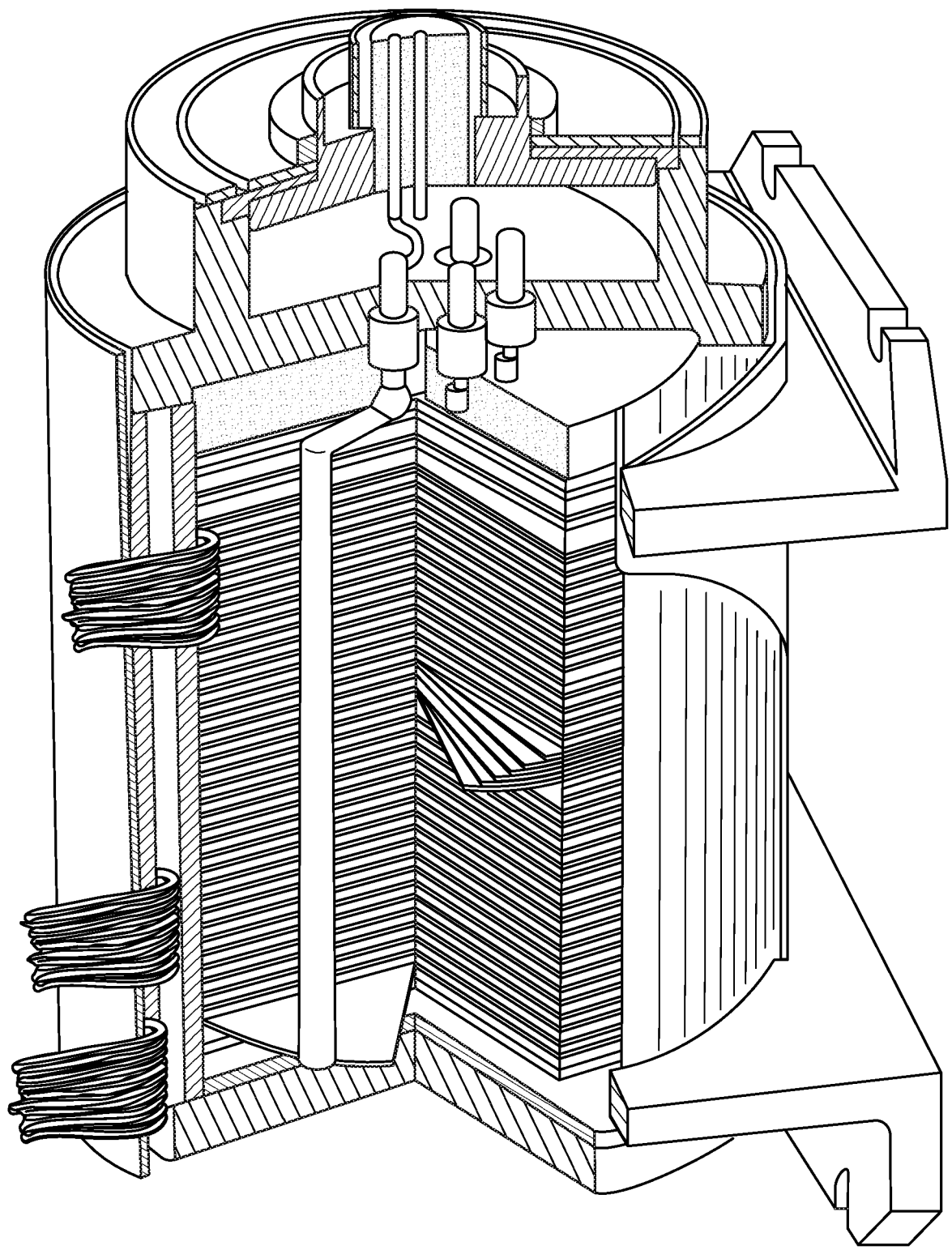
FIG. 1 is a drawing of a section view of a prior art FeS$_2$//Li—Si thermal battery.
Figure 2B:
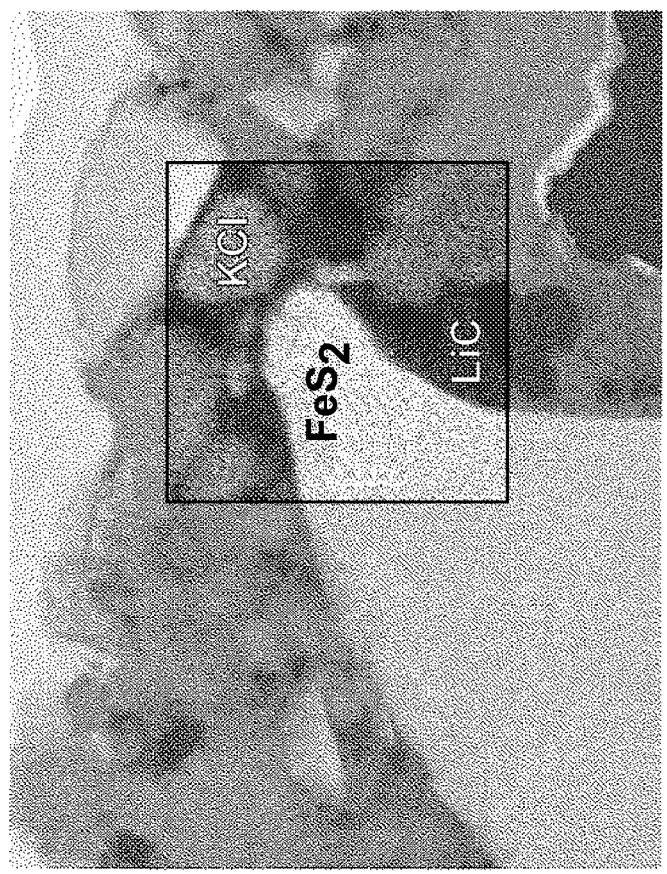
FIG. 2B is a TEM image showing elemental mapping of a cathode fabricated by an embodiment of the present invention and using a salt based binder showing conductive salt contacting the active surfaces with no SiO$_2$ formed on the active surfaces.
Figure 2A:
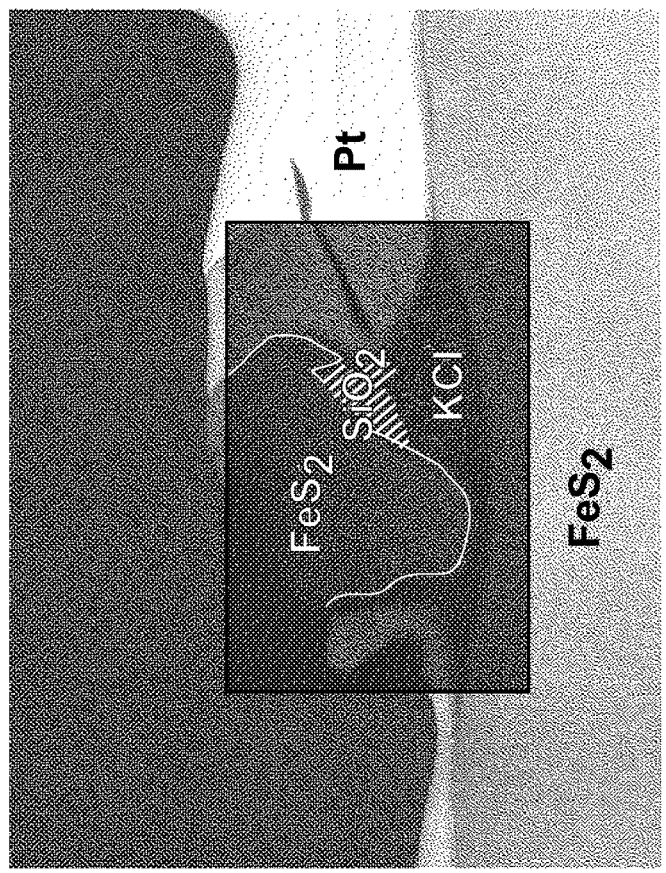
FIG. 2A is a transmission electron microscope (TEM) image of a cathode produced using a prior art method showing elemental mapping of the active FeS$_2$ in a TEOS cast cathode with insulating SiO$_2$ formed on the active surfaces.

The development of a binder system that can yield an effective cast electrode and survive the extreme conditions of a thermal battery without compromising performance has previously proven challenging. The binder preferably produces uniform and mechanically robust films with good current collector adhesion, is stable at both the cathode and anode potentials of, respectively, about 2V and about 0.1V versus Li/Li$^+$, is stable up to the TB operating temperature of greater than or equal to about 550° C., and does not inhibit ionic conductivity or the active material reactions. Binders of tetraethyl orthosilicate (TEOS) have been previously developed that were able to successfully demonstrate high quality cast films and provide a basis for some of the claimed benefits of cast electrodes relative to pellets. However, the TEOS binders fell short on a number of properties necessary to effectively function as a TB binder. First, TEOS is unstable at the low electrochemical potentials of attractive anode materials like Li—Si, LiB, or LiAl. This typically necessitates the use of Mg foil as the anode instead, which means a roughly 0.6 V potential sacrifice per cell, negating much of the benefits of having thinner cast electrodes and causing issues related to the depletion of lithium in the electrolyte during discharge. In addition, the TEOS selectively deposits an insulating SiO$_2$ layer on the surface of the active FeS$_2$ material in the cathode, isolating the FeS$_2$ from the lithium ions in the electrolyte salt and causing very high impedance. See, for example, FIG. 2A. The use of a salt binder instead of a TEOS binder in embodiments of the present invention prevents the formation of an insulting SiO$_2$ layer and avoids the issues present in the TEOS system as the salt is already an inherent part of developed TB technology and is therefore compatible with all components. In addition, the salts themselves are ionically conductive so there is no concern of forming insulating SiO$_2$ or other insulating layers that isolate the active materials as was the case with TEOS, as shown in FIG. 2A. As shown in FIG. 2B, the TB electrode films cast using the salt binder system of the present invention demonstrate good film quality in terms of both adhesion to the current collector substrate and film cohesion, as well as unimpeded contact between electrolyte salt and the active material. No SiO$_2$ is formed in FIG. 2B. Electrodes fabricated using a salt binder of the present invention are also able to effectively discharge under high current draw, demonstrated up to about 2 A/cm$^2$ with low polarization. All of these are metrics to facilitate the incorporation of cast materials into practical and cost-saving TBs.

Cell Design with Cast Films

Embodiments of the present invention include the incorporation of all three primary TB components of cathode, anode, and separator (not including heat pellet) into different slurries each with a salt binder that can be cast into separate films. For example, there can be a film for a cathode, a separate film for an anode, and a third film for the separator. Alternatively, the cathode and separator components can be incorporated into separate slurries with a salt binder and cast into separate films while the anode is an active foil material, such as lithium-boron or lithium-aluminum. The salt binder of the present invention is preferably inorganic and the slurries are preferably not aqueous. The separately cast films can then be built up from a current collector substrate such that the cathode is cast onto the current collector, the separator is cast onto the cathode, and then the anode is cast or applied onto the separator. In another embodiment, the process can be simplified by separately casting the cathode and anode on their own current collectors, casting the separator on whichever active material is more receptive to the process, and then stacking the two cast films against each other to complete the cell. In another embodiment, the separator film can be cast upon an active anode foil, and the cathode film subsequently cast upon the separator.

Fabrication of Cast TB Films

The fabrication of the TB electrode films involves the incorporation of the TB material into a slurry capable of being cast into a thin film. The first step in this process is to prepare a salt binder solution by dissolving an adequate amount of the selected salt binder into a solvent. In general, it has been observed that a salt content of at least about 10 mg/mL, preferably at least 20 mg/mL obtains adequate film adhesion. As the salts considered for use in this binder system are highly ionic, solvents with high dielectric constants of at least 20 or more typically dissolve enough of the binder salt. After the salt binder is dissolved into the solution, the active material (examples include but are not limited to: FeS2, CoS2, LiSi, LiAl, or combinations thereof) is added to form a particulate slurry. This slurry is substantially homogenized using a high shear mixing process, such as, for example, ball milling. Once homogenized, the slurry can be deposited onto a current collecting substrate via any process used to form films from particulate containing slurries, such as, for example, tape-casting, roll-to-roll coating, gravure printing, and 3D printing or additive manufacturing. The current collector serves as both a substrate to the coating to provide mechanical support, as well as an electrical connection for the electrode film during operation. The current collector can be composed of a thin metallic or carbon sheet, such as stainless steel or flexible graphite material, like Grafoil®. However, as the surface interface can be a weak point in the deposited films, resulting in delamination upon failure, porous and/or partially permeable current collectors such as carbon felt or carbon paper can be utilized to increase film adhesion to the current collector and allow for reduction of the salt content in the slurry. Once deposited as a film on a current collector, the electrode is dried to remove the solvent, causing the dissolved salt binder to precipitate out of solution and mechanically bind the film. The electrode can be dried by heating to approximately 40-150° C. under dry air, inert gas, or vacuum.

The solvents selected for making slurries are preferably compatible with the TB materials that are incorporated into the slurry—which eliminates water as a candidate despite its ability to readily dissolve the salt binders—and must also be easily dried or removed from the cast film prior to assembly into a cell. Table 1 summarizes some example solvents and their respective performance in the cathode, anode, and separator slurries. Of the solvents tested, dimethyl sulfoxide (DMSO) yielded the best film quality and performance in both the cathode film and separator film, but was reactive towards the anode active material. Fortunately, because the solvent is removed from the film prior to cell assembly, the incompatibility of DMSO with the Li—Si anode material does not preclude its use in the cathode as only the non-reactive salt binder remained during assembly.

TABLE 1

Non-limiting example solvents for TB cast films and their performance with different TB materials.

| Solvent | Salt Solubility | Performance in Cathode Slurry | Performance in Separator Slurry | Performance in Anode Slurry |
|---|---|---|---|---|
| Water | Very high | Difficult to remove water from salt binder; reactive to FeS$_2$ active material | Difficult to remove water from salt binder | Difficult to remove water from salt binder; reactive to Li—Si active material |
| γ-Butyrolactone | Very low | Insufficient dissolution of salt | Insufficient dissolution of salt | Insufficient dissolution of salt |
| Ethylene carbonate | Low | Insufficient dissolution of salt | Insufficient dissolution of salt | Insufficient dissolution of salt |
| Fluorinated ethylene carbonate | Low-moderate | N/A | Under investigation | Low reactivity to Li—Si, poor film quality |
| Propylene carbonate | Low-moderate | N/A | Under investigation | Low reactivity to Li—Si, poor film quality |
| N-methyl formamide | High | Good performance; somewhat difficult to remove NMF from cast film | Swelling and very poor film quality when cast on NMF cathode | Reactive to Li—Si active material |
| Dimethyl sulfoxide | Moderate | Excellent performance | Good performance | Mildly reactive with Li—Si |
| Dimethyl methylphosphonate | Moderate | N/A | Reactive to MgO separator material | Mildly reactive with Li—Si |
| Propylene | High | N/A | Moderate performance | Reactive to Li—Si active material |
| 2-methyl tetrahydrofuran | Very low | Insufficient dissolution of salt | Insufficient dissolution of salt | Insufficient dissolution of salt |
| Xylene | Very low | Insufficient dissolution of salt | Insufficient dissolution of salt | Insufficient dissolution of salt |

Figure 3:
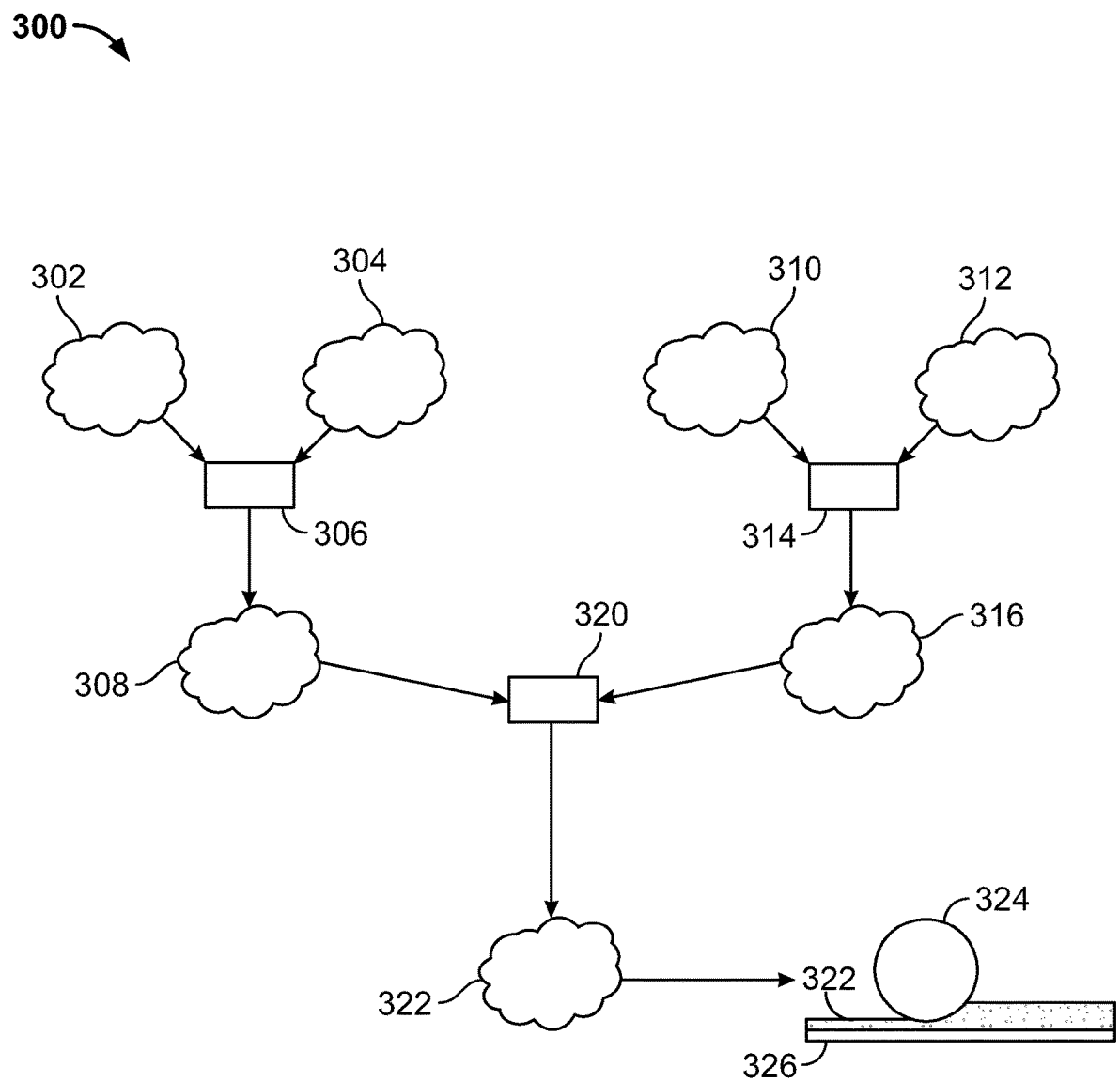
FIG. 3 is a schematic illustration of a method for casting a TB cathode, anode or separator.

FIG. 3 shows method 300 for producing cast cathodes, anodes and separators as an example for the general fabrication of cast TB films that form the TB. In FIG. 3, a cast cathode, anode, or separator is made when salt binder 302 is mixed with solvent 304 at step 306 to form binder solution 308. Separately, active material 310 is optionally mixed with eutectic or electrolyte salt 312 at step 314 to form active material slurry 316. Electrolyte salt 312 is used particularly when forming cathodes. Binder solution 308 is mixed with active material slurry 316 (which may or may not include electrolyte salt 312) at step 320 to form substantially homogeneous slurry 322. Slurry 322 is then disposed or cast on current collector 326 via film laydown process 324 and dried. Film laydown process can include but not be limited to gravure, doctor blade, screen print, additive manufacturing, or other thick and thin film methods. Once the cast cathode, anode, and separator are dried, they can be stacked and cut or punched from the film to form an electrode. In an alternative embodiment, a cathode and a separator are produced via the process shown in FIG. 3, and an anode is a foil anode that is disposed on the separator to form a TM.

The following is a non-limiting example of the process shown in FIG. 3, the solvent used for the process was DMSO with a dielectric constant of about 47 and a boiling point of about 189° C. However, another inorganic solvent can be used. The solvent is preferably not aqueous. Roughly 40-100 mg of LiCl as the salt binder was added per mL of DMSO solvent and the materials were mixed until the salt was fully in solution. Then, a premixed combination of $FeS_2$ active material and LiCl:KCl electrolyte salt was added to the binder solution at about 20-50 volume percent. This mixture was milled in a ball mill for about 1-2 hours until a substantially homogenous slurry was produced, at which point it was tape cast onto a current collector of carbon paper. This cast cathode was then dried at elevated temperatures between about 40-150° C. under both flowing air and then vacuum to remove all solvent material (any remaining solvent vaporizes on TB activation to the detriment of the cell performance).

Performance of Cast TB Films

As mentioned previously in the case of TEOS binder, the creation of quality films is not the only factor limiting the realization of cast films for TB components. Cast films with salt binders should theoretically work similarly to their pellet counterparts due to the addition of minimal new material components within the TB. However, issues can and do arise through several avenues: persistence of solvent species in the films that react or off-gas within the assembled cell; reaction of the solvent with the active material during processing that interrupts the battery reaction; or unfavorable film morphology that negatively affects cell performance. As such, single cell discharge tests were carried out with the various example cast film components assembled versus pellet counterparts in order to independently test the performance of each cast film component. Single cell testing was carried out using a dedicated setup inside an argon-filled glovebox. In this test configuration, example cells of cathode, separator, and anode were stacked between current collectors and sealed between two mica sheets. The assembled cell was activated by being placed between two platens heated to about 525° C. with the cell leads attached to both a programmable load and a controlled data acquisition system to measure the cell performance.

Cathode Performance

Figure 4A:
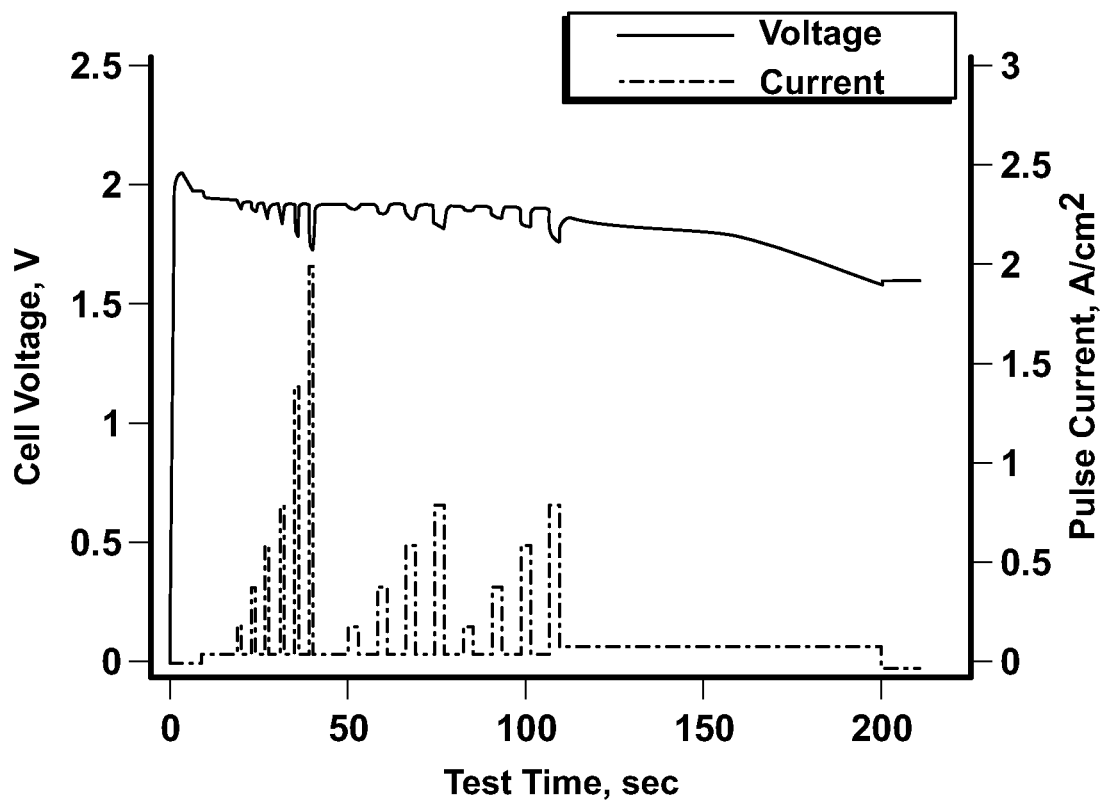
FIG. 4A is a graph of the voltage profile of a cast cathode with a pellet separator and an anode under pulsed current load up to about 2 A/cm$^2$.
Figure 4B:
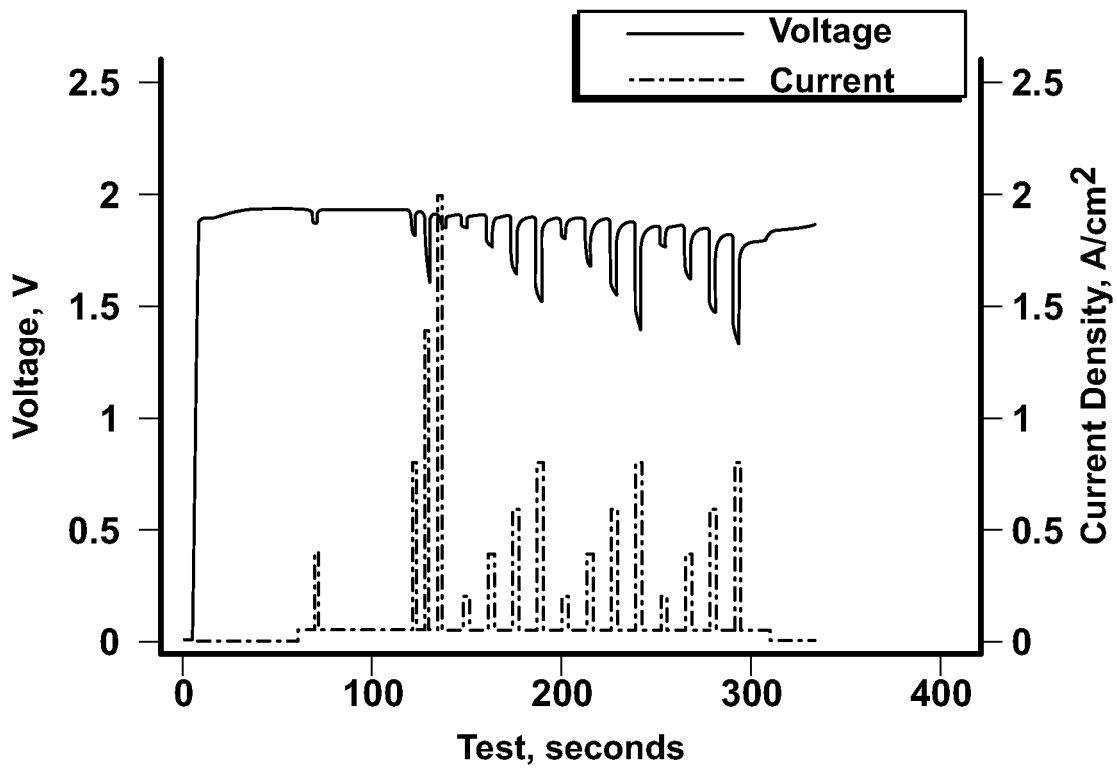
FIG. 4B is a graph of the pellet single cell voltage profile pulsed up to about 2 A/cm$^2$ with subsequent pulses up to about 800 mA/cm$^2$.

Non-limiting example cast cathodes fabricated using a process described above were tested with a pellet separator and anode of, respectively, MgO/electrolyte salt and Li—Si. As shown in FIG. 4(A), the cast cathodes using an embodiment of the present invention were able to maintain a voltage of greater than or equal to about 1.5V even during 2 $A/cm^2$ of current draw. Compared to the baseline single cell results for an all pellet assembly in FIG. 4(B), the performance of the cast cathode of the present invention is on par with or better than its pellet counterpart. Impedance values calculated based on the potential drop observed during current pulsing of these cells shows that cast cathodes yield lower impedance values of about 0.25$\Omega$-$cm^2$ compared to 0.44$\Omega$-$cm^2$ for the pellet cathode configuration.

Separator Performance

Figure 5A:
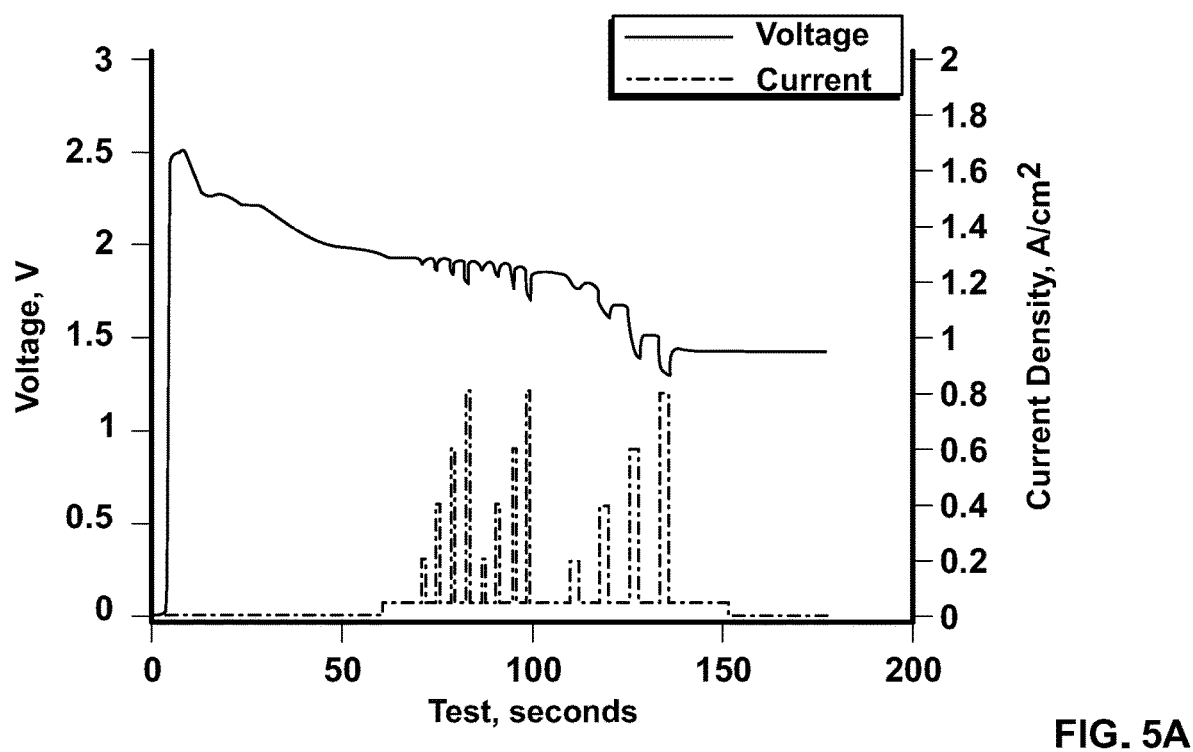
FIG. 5A is a graph of the voltage profile of a cast DMSO separator and cast NMF cathode and the current profile of an anode under pulsed current up to about 800 mA/cm$^2$.
Figure 5B:
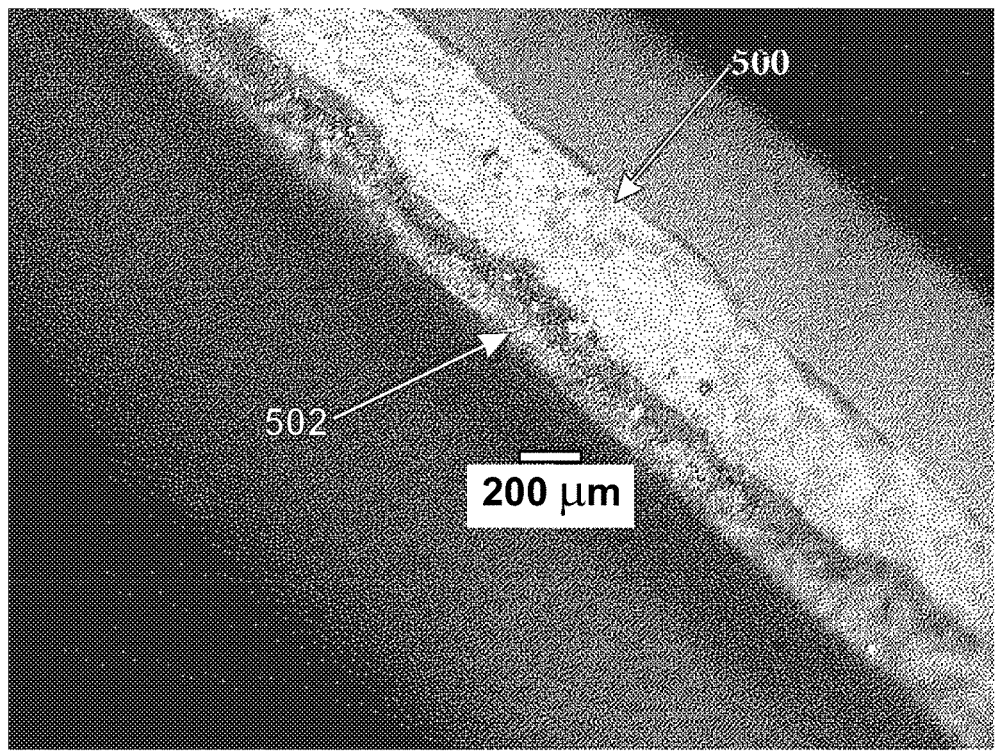
FIG. 5B is an image of the cross-section of a separator using a DMSO solvent cast over a cathode film.

Non-limiting example cast separators were prepared and tested utilizing MgO and LiCl:KCl mixed into solution using DMSO as the solvent and LiCl as the added binder salt. The separators were cast over a previously tested NMF solvent cathode such that their performance could be compared relative to the same cast cathodes with pellet separators. FIG. 5(A) shows the voltage performance of the DSMO separator and NMF cathode and a current profile of an anode under current pulses of up to about 800 $mA/cm^2$. The data shows a reduced voltage rise time upon initial activation relative to the separators due to a more intimate and pre-wetted surface between the cathode and separator. In addition, the separator supports the high current pulses of about 800 $mA/cm^2$ with a low polarization of only about 150 mV and was able to maintain cell OCV during periods of rest. FIG. 5(B) shows a side view of cast separator 500 utilizing DMSO as the solvent cast over NMF cast cathode 502.

Anode Performance

Non-limiting example cast anodes include Li—Si as the active material which is a strong reducing agent, making it difficult to find a solvent system that can yield a suitable slurry without adversely reacting with the Li—Si. Both NMF and DMSO, which had been effective when utilized in cathode casting, proved to be reactive towards Li—Si. While able to produce operational anode films, the impedance values of cast Li—Si anode films was high. This high impedance may be a result of a reaction with the Li—Si active material.

Figure 6A:
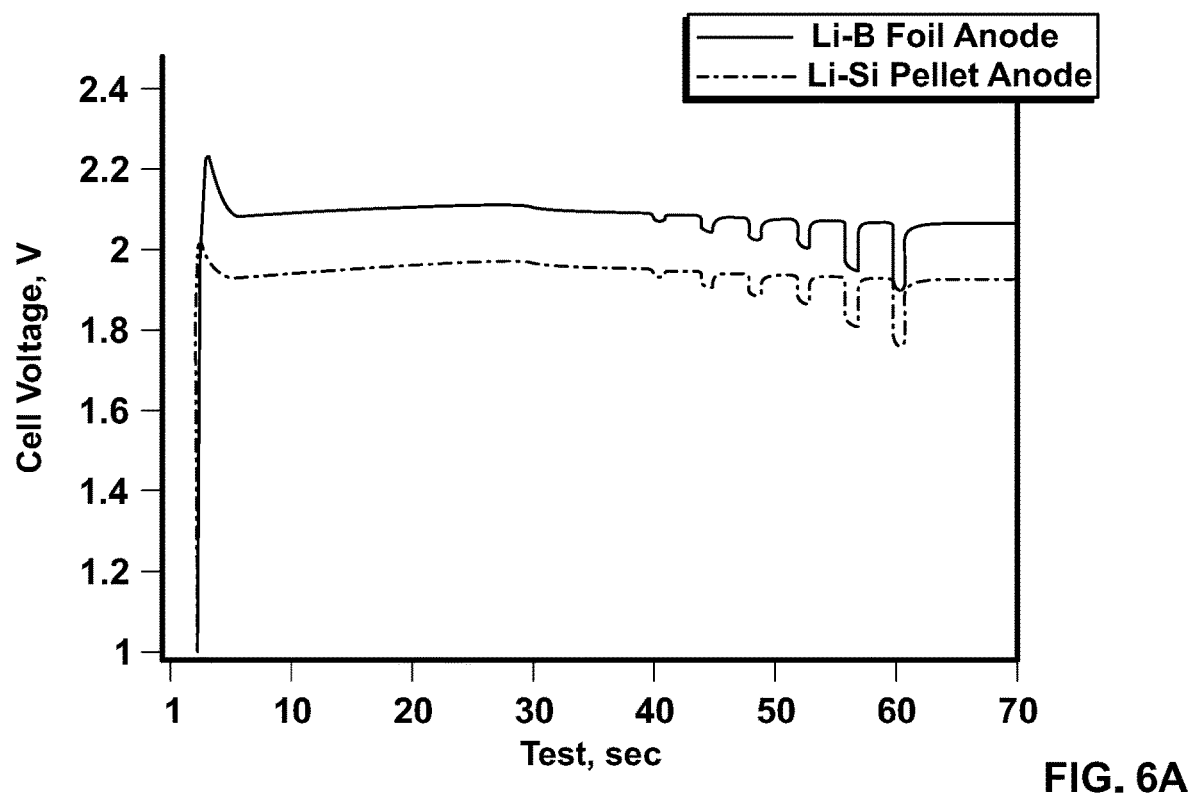
FIG. 6A is a graph of the voltage profile of a Li—Si pellet compared to a LiB foil anode with pulsing up to about 2 A/cm$^2$.
Figure 6B:
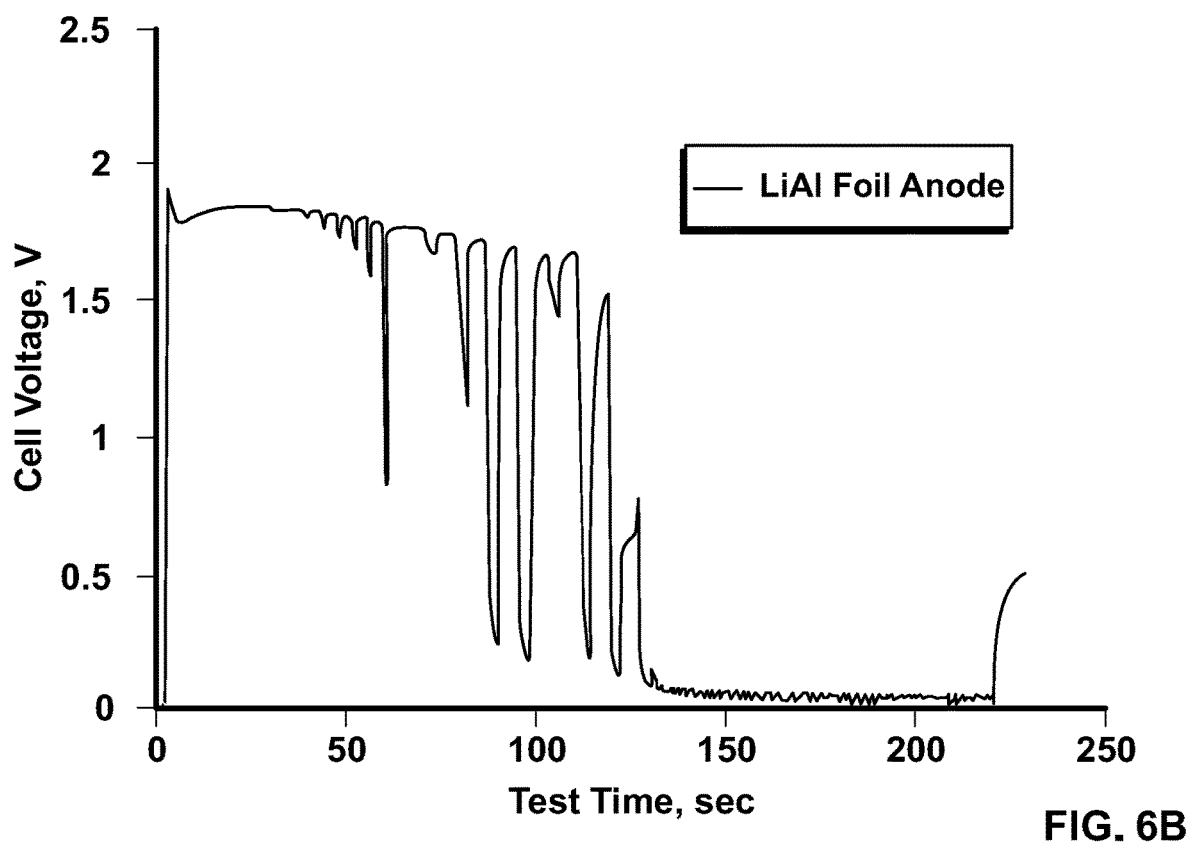
FIG. 6B is a graph of the voltage profile of a LiAl foil anode with pulsing up to about 2 A/cm$^2$.

As an alternative to cast anodes using a salt binder, the cast cathodes and separators can be paired with a foil anode to enable improved performance while maintaining many of the advantages of cast electrode architectures. Foil anodes of note include, but are not limited to a lithium-boron alloy (LiB) and a lithium aluminum alloy (LiAl). FIG. 6(A) shows the performance of a LiB foil anode relative to a Li—Si pellet anode while FIG. 6(B) shows the performance of a LiAl anode foil.

The present invention has been described as cast thermal battery electrodes and separators using a salt binder. It will be understood that the above description is merely illustrative of the applications of the principles of the present invention, the scope of which is to be determined by the claims viewed in light of the specification. Other variants and modifications of the invention will be apparent to those of skill in the art. The entire disclosures of all references, applications, patents, and publications cited above are hereby incorporated by reference.

We claim:

1. A method for fabricating a cast thermal battery film, comprising:
   dissolving a salt binder into a solvent forming a salt binder solution;
   adding an active material to the salt binder solution;
   mixing the salt binder solution and the active material mixture to form a slurry;
   casting the slurry onto a substrate; and
   removing the solvent from the cast film to bring the salt binder out of solution to bind the film.

2. The method of claim 1, wherein the mixing comprises high shear mixing.

3. The method of claim 2, wherein the high shear mixing comprises ball milling.

4. The method of claim 1, wherein the slurry is substantially homogeneous.

5. The method of claim 1, wherein the casting comprises a film-laydown process.

6. The method of claim 1, wherein the film laydown process comprises additive manufacturing.

7. The method of claim 1, further comprising shaping the cast film into a form factor.

8. The method of claim 1, wherein the active material comprises metal sulfides.

9. The method of claim 1, wherein the active material comprises a lithium alloy.

10. The method of claim 1, wherein the separator material comprises MgO.

11. The method of claim 1, wherein the salt binder comprises an alkali halide salt.

12. The method of claim 1, wherein an amount of salt binder is greater than 20 mg/mL of solvent.

13. The method of claim 1, wherein the solvent comprises a high dielectric organic solvent.

14. The method of claim 1, wherein the substrate comprises a current collector of a thin film of metal.

15. The method of claim 1, wherein the substrate comprises a porous conductive sheet with a degree of permeability to the slurry to facilitate enhanced film adhesion.

16. The method of claim 15, wherein the substrate comprising a porous metal.

17. The method of claim 1, wherein the substrate comprises an anode.

18. The method of claim 1, wherein the removing the solvent comprises drying the cast film.

19. The method of claim 1, wherein the thermal battery is greater than 1 A/cm2.

* * * * *